Oct. 19, 1943.　　　M. SPINELLO　　　2,332,118
CLUTCH FOR LAWN MOWER REEL DRIVE MECHANISM
Filed Jan. 19, 1942
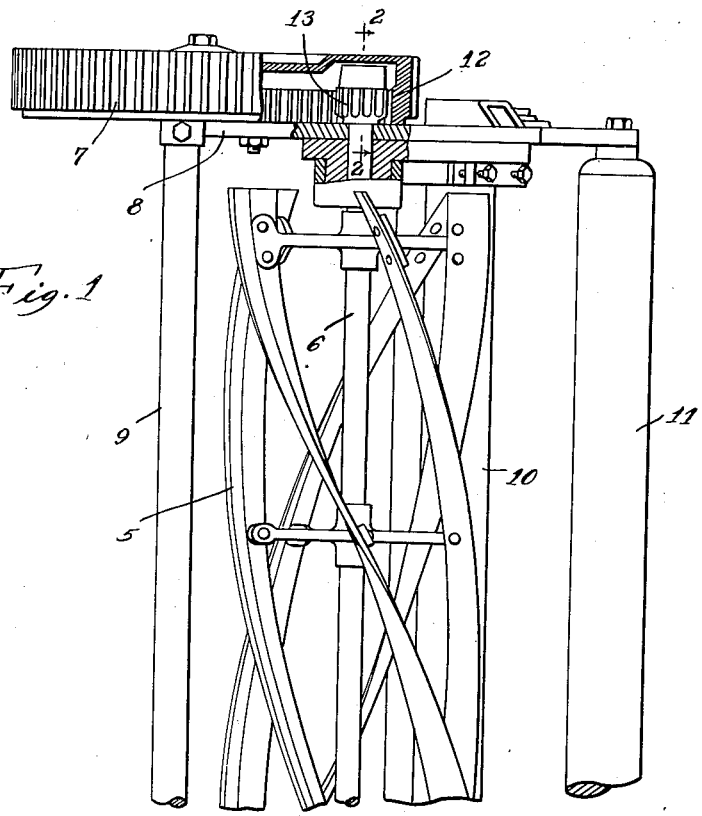
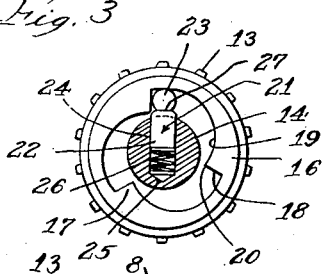
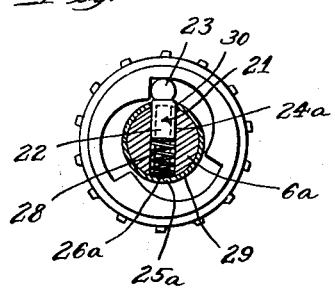
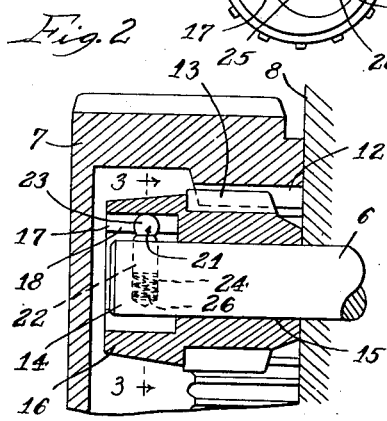
Inventor:
Matthew Spinello
By
McCanna, Wintercorn & Morsbach
Attys.

Patented Oct. 19, 1943

2,332,118

UNITED STATES PATENT OFFICE 2,332,118

CLUTCH FOR LAWN MOWER REEL DRIVE MECHANISMS

Matthew Spinello, Rockford, Ill., assignor of one-half to Lemuel J. Wood, Rockford, Ill Application January 19, 1942, Serial No. 427,275

8 Claims. (Cl. 192—46)

This invention relates to a new and improved lawn mower reel drive mechanism.

The drive pinions on lawn mowers that mesh with the internal gears on the wheels have been a source of trouble and necessitated frequent replacement, due to the fact that the ratchet teeth on the inside of the hub of the pinion are subjected to such an intensive hammering by the pawl that they soon get rounded or chipped off to such an extent that the pawl can no longer take hold properly and the reel accordingly is not driven satisfactorily. The reason for that difficulty as I have analyzed it is that the pawl relies for its movement to driving position upon a camming action derived by sliding engagement of the pawl with the backs of the ratchet teeth, and the more the ratchet teeth are damaged by the hammering of the pawl the worse the hammering becomes, so that the difficulty mentioned multiplies and in a short time the lawn mower requires replacement of the drive pinion and pawl, which represent a sizable outlay of cash for the owner. It is therefore the principal object of my invention to provide an improved reel drive mechanism in which the pawl cooperating with the ratchet teeth on the pinion is spring pressed toward driving position and has a rounded head for engagement with the teeth to insure full engagement instantaneously, whereby to eliminate the objectionable rounding and chipping off of the edges of the teeth and actually enable use of old and otherwise unfit drive pinions on existing lawn mowers where only the pawl may require replacement by a pawl made in accordance with my invention.

The outer or head end of the pawl being connected to the shank portion by a reduced neck is arranged to have engagement with the teeth of the ratchet away from the edge portions only, thus eliminating the objectionable wearing off of the edge portion and enabling use of drive pinions in which the edge portions of the ratchet teeth have become rounded, worn away, or broken off, more or less.

Another object consists in the provision of an improved reel driving pawl of the kind mentioned, and a tubular adapter therefor which will permit mounting the same on existing lawn mowers as a replacement part.

The invention is illustrated in the accompanying drawing, in which—

Figure 1 is a view partly in plan elevation and partly in horizontal section of a lawn mower equipped with reel drive mechanism made in accordance with my invention, a portion of the mower being broken away in order to save space in the drawing and permit showing the parts on a larger scale;

Fig. 2 is an enlarged sectional detail on the line 2—2 of Fig. 1;

Fig. 3 is a sectional detail on the line 3—3 of Fig. 2, and

Fig. 4 is a similar sectional detail illustrating a modified or alternative construction, including the adapter.

Similar reference numerals are applied to corresponding parts throughout the views.

Referring first to Figs. 1 to 3, the reference numeral 5 designates the reel, which turns with the shaft 6 between the usual pair of wheels, only one of which is shown at 7 next to the side frame member 8. The side frame members are rigidly connected in the usual way by a crossbar 9, and carry the cutterbar, indicated at 10, and roller 11. As indicated on the wheel 7, the wheels have internal gear teeth 12 meshing with pinions 13 carried on the ends of the reel shaft 6, which as indicated at 14 in Fig. 2 project into the space inside the wheels for support of the drive pinions. The drive pinions are furnished of right and left hand for use on the opposite sides of the mower in connection with the right and left wheels, respectively, only the right hand pinion 13 being shown. Both pinions have circular axial bores 15 which receive the end portions 14 of the shaft 6 with an easy working fit, and they also have a hollow hub portion 16 on the outer side thereof away from the frame of the mower with ratchet teeth 17 formed on the inside thereof in equally circumferentially spaced relation. Each tooth of the ratchet provides a front or driving face 18 substantially parallel to a radius of the pinion and an eccentric back face 19 extending rearwardly from the edge 20 of the tooth. It is along these faces 19 in the conventional unimproved lawn mower that the ends of a reciprocable pawl slidably mounted in a hole or slot extending diametrically through the end portion of the reel shaft is arranged to have sliding engagement so as to impel the pawl into driving relationship to the front or driving face 18 as the pinion is turned relative to the shaft. When the mower is backed up, the pawl, due to the counterclockwise rotation of the pinion with respect to the shaft as viewed in Fig. 3, will be reciprocated idly, but upon forward movement of the mower whichever end of the pawl is projecting in front of one of the driving faces 18 will assume the drive and cause the reel shaft to turn with the pinion to turn the reel 5 in a clockwise direction. As previously indicated, however, the ratchet impelled pawl has not given satisfactory operation. Examination of many mowers sent to the repair-shop because of defective reel drive mechanisms showed that the pinions had the edges 20 of the teeth 17 chipped off to such an extent that they did not present sufficiently sharply defined shoulders for the pawl to take hold of, and judging from the nature of the chipping process it is apparent that the pawl when operated in the old way mentioned would take hold of the ratchet teeth only near the very edge and evidently the chipping was caused by the pawl giving the edge portions of the teeth a glancing blow as the pinion was spun rapidly relative to the reel shaft. The force of these blows can be appreciated when it is realized that on short cuts around trees and bushes the mower is given quick back and forth movements, and at the end of each long run the operator will invariably throw his full weight against the handle in order to start the reel spinning rapidly for easiest cutting. Once the ratchet teeth become worn or chipped to any extent, the worse this wear and tear becomes because the pawl has less and less of each tooth to work on and less and less of each tooth to impel the pawl toward its engaged position. The experience of lawn mower repairmen is that nine out of ten lawn mowers that are sent to the repair-shop require replacement of the drive pinions for the reasons stated. In a large proportion of these cases the mowers are really new and require no other repair.

The pawl 21 of my invention is so constructed and operated that the objections mentioned above are all eliminated. This pawl has a cylindrical shank portion 22 and a spherically conformed outer end portion 23. A hole 24 drilled in the end portion 14 of the reel shaft along a diameter thereof but not all the way through receives the shank portion 22 of the pawl with an easy working fit, while the inner end 25 of the hole serves as a support for a coiled compression spring 26 inserted behind the pawl to urge the pawl normally outwardly toward driving position. This spring insures full engagement of the pawl with the ratchet teeth at all times so that the old objection of the teeth having their edge portions chipped off is definitely eliminated, the pawl having engagement with each tooth as far away from the edge portion as it is possible for the pawl to move, the movement being limited by engagement of the pawl with the end of the back face 19 of the next tooth. The spherical form of the driving end 23 of the pawl is of advantage in four ways: First, in allowing the end of the pawl to ride with less friction over the teeth when the pinion is turned in the reverse direction; second, in permitting the pawl to move outwardly part way toward the driving position even before the ratchet tooth has moved all the way past the pawl; third, in permitting the pawl to have point contact with the driving faces 18 of the ratchet teeth so that the pawl can turn with respect to the driving faces and therefore not present the same portion of the driving end of the pawl to the driving faces of the ratchet teeth continuously, and fourth, in insuring the engagement of the driving end 23 of the pawl in radially outwardly spaced relation to the edge portion 20 of each tooth, so that regardless of wear on the edge portions of the teeth a good driving connection is established at all times. In connection with the fourth point it will be noted that the pawl is cut away or relieved annularly, as indicated at 27, between the shank portion 22 and the spherical end portion 23 so that only the spherically conformed end portion 23 can have contact with the driving faces 18 of the teeth 17 of the ratchet. Needless to say the spherically conformed end portion 23 is no larger in diameter than the shank portion 22 so that there is no interference with the end portion 23 moving into and out of the hole 24 as the pawl is reciprocated.

Where the invention is to be applied to existing mowers and the reel shaft 6a, as shown in Fig. 4, has a diametrically extending slot 28 provided therein, I contemplate drilling a hole 24a through the shaft of sufficient diameter in relation to the width of the slot to provide a satisfactory guide for the cylindrical shank 22 of the pawl 21 as well as a guide for the coiled compression spring 26a, which in such an installation will be of slightly greater length than the spring 26 due to the greater length of the hole 24a. An adapter sleeve 29 having a close or press fit on the end of the shaft 6a and provided with a hole 30 registering with the hole 24a is small enough in outer diameter to fit easily between the edge portions 20 of the teeth of the ratchet while still providing a support 25a for the end of the spring 26a. In many instances where mowers are sent to the repair-shop for repair of the reel drive mechanism, it will be sufficient if the pawl 21 is substituted for the old conventional reciprocating pawl of the kind designed to be impelled by the ratchet, because in most cases the drive pinion is still sufficiently serviceable to be used with the improved pawl of my invention, inasmuch as the present pawl does not rely upon sharply defined points 20 on the ratchet teeth.

It is believed the foregoing description conveys a good understanding of the objects and advantages of my invention. The appended claims have been drawn to cover all legitimate modifications and adaptations.

I claim:

1. In a lawn mower of the type including a rotatably mounted reel shaft and a driven pinion loosely mounted thereon, a clutch device comprising an internal ratchet on the driven pinion having ratchet teeth in circumferentially spaced relation relative to the shaft, a plunger type pawl reciprocable radially with respect to said shaft in a hole provided therefor in said shaft and adapted to project from one side of the shaft for driving engagement with any tooth of the ratchet, and spring means normally urging said pawl outwardly toward engagement with the ratchet, said pawl having an inner end portion reciprocable freely in the hole in said shaft and having an outer end portion of spherical configuration joined to the inner end portion by an annularly reduced neck portion so that the driving engagement of said spherical end portion with a ratchet tooth always occurs at a point spaced radially outwardly from the radially inner end of the tooth.

2. In a lawn mower of the type including a rotatably mounted reel shaft and a driven pinion loosely mounted thereon, a clutch device comprising an internal ratchet on the driven pinion having ratchet teeth in circumferentially spaced relation relative to the shaft, a plunger type pawl reciprocable radially with respect to said shaft in a hole provided therefor in said shaft and adapted to project from one side of the shaft for driving engagement with any tooth of the ratchet, and spring means normally urging said pawl outwardly toward engagement with the ratchet, said pawl having the inner end portion thereof rotatable freely in the hole in said shaft and having the outer end portion thereof of spherical configuration and small enough in diameter to permit retraction thereof into the hole in the shaft, the spherically conformed outer end portion being joined to the inner end portion by an annularly reduced neck portion so that the driving engagement of said spherical end portion with a ratchet tooth always occurs at a point spaced radially outwardly from the radially inner end of the tooth.

3. In a lawn mower of the type including a rotatably mounted reel shaft and a driven pinion loosely mounted thereon, a clutch device comprising an internal ratchet on the driven pinion having ratchet teeth in circumferentially spaced relation relative to the shaft, a cylindrical plunger type pawl reciprocable radially with respect to said shaft and also free to turn in a hole provided therefor in said shaft and adapted to project from one side of the shaft for driving engagement with any tooth of the ratchet, spring means normally urging said pawl outwardly toward engagement with the ratchet, the hole in said shaft extending diametrically therethrough, and a sleeve surrounding the shaft and covering one end of the hole so as to provide an abutment for the outer end of the spring, said sleeve having a circular opening provided therein on the diametrically opposite side for extension therethrough of the pawl.

4. In a lawn mower of the type including a rotatably mounted reel shaft and a driven pinion loosely mounted thereon, a clutch device comprising an internal ratchet on the driven pinion having ratchet teeth in circumferentially spaced relation relative to the shaft, a plunger type pawl reciprocable radially with respect to said shaft in a hole provided therefor in said shaft and adapted to project from one side of the shaft for driving engagement with any tooth of the ratchet, spring means normally urging said pawl outwardly toward engagement with the ratchet, the hole in said shaft extending diametrically therethrough, and a sleeve surrounding the shaft and covering one end of the hole so as to provide an abutment for the outer end of the spring, said sleeve having an opening provided therein on the diametrically opposite side for extension therethrough of the pawl, said pawl having the inner end portion thereof rotatable freely in the hole in said shaft and having the outer end portion thereof of spherical configuration and small enough in diameter to permit retraction thereof into the hole in the shaft.

5. In a lawn mower of the type including a rotatably mounted reel shaft and a driven pinion loosely mounted thereon, a clutch device comprising an internal ratchet on the driven pinion having ratchet teeth in circumferentially spaced relation relative to the shaft, a plunger type pawl reciprocable radially with respect to said shaft in a hole provided therefor in said shaft and adapted to project from one side of the shaft for driving engagement with any tooth of the ratchet, spring means normally urging said pawl outwardly toward engagement with the ratchet, the hole in said shaft extending diametrically therethrough, and a sleeve surrounding the shaft and covering one end of the hole so as to provide an abutment for the outer end of the spring, said sleeve having an opening provided therein on the diametrically opposite side for extension therethrough of the pawl, said pawl having the inner end portion thereof rotatable freely in the hole in said shaft and having the outer end portion thereof of spherical configuration and small enough in diameter to permit retraction thereof into the hole in the shaft, the spherically conformed outer end portion being joined to the inner end portion by an annularly reduced neck portion so that the driving engagement of said spherical end portion with a ratchet tooth always occurs at a point spaced radially outwardly from the radially inner end of the tooth.

6. A clutch device, including, in combination, a driving member and a driven member, a cylindrical pawl movable endwise on the driven member radially relative thereto and also free to turn about its own axis, spring means normally urging said pawl in one direction, said driving member being provided with a circular series of notches presenting flat drive faces substantially parallel to the pawl in driving position for driving engagement with the outer end portion of the pawl, the outer end portion of said pawl being of spherical configuration and joined to the rest of the pawl by an annularly reduced neck portion so that the driving engagement of the pawl with the drive face on the driving member always occurs at a point spaced radially outwardly from the radially inner end of said drive face.

7. A clutch device, including, in combination, a driving member and a driven member, a cylindrical pawl movable endwise on the driven member radially relative thereto and also free to turn about its own axis, spring means normally urging said pawl in one direction, said driving member being provided with a circular series of notches presenting flat drive faces substantially parallel to the pawl in driving position for driving engagement with the outer end portion of the pawl, the outer end portion of said pawl being of spherical configuration and small enough in diameter to permit retraction thereof into the driven member, the spherically conformed outer end portion being joined to the rest of the pawl by an annularly reduced neck portion so that the driving engagement of the pawl with the drive face on the driving member always occurs at a point spaced radially outwardly from the radially inner end of said drive face.

8. A clutch device including, in combination, a shaft member and a second member rotatable with respect thereto, one of said members being the drive member and the other the driven member, a cylindrical plunger type pawl reciprocable radially with respect to the shaft member and also free to turn in a hole provided therefor in said shaft member and adapted to project from one side of the shaft member for driving engagement with the second member, the second member being provided with a circular series of notches presenting flat drive faces substantially parallel to the pawl in driving position for driving engagement with the outer end portion of the pawl, the outer end portion of said pawl being of spherical configuration and joined to the rest of the pawl by an annularly reduced neck portion, so that the driving engagement of the pawl with the drive face on the second member always occurs at a point spaced radially outwardly from the radially inner end of said drive face, spring means normally urging said pawl outwardly toward engagement with the second member, the hole in said shaft member extending diametrically therethrough, and a sleeve surrounding the shaft member and covering one end of the hole so as to provide an abutment for the outer end of the spring, said sleeve having an opening provided therein on the diametrically opposite side from said abutment for extension therethrough of the pawl.

MATTHEW SPINELLO.